Figure 1:
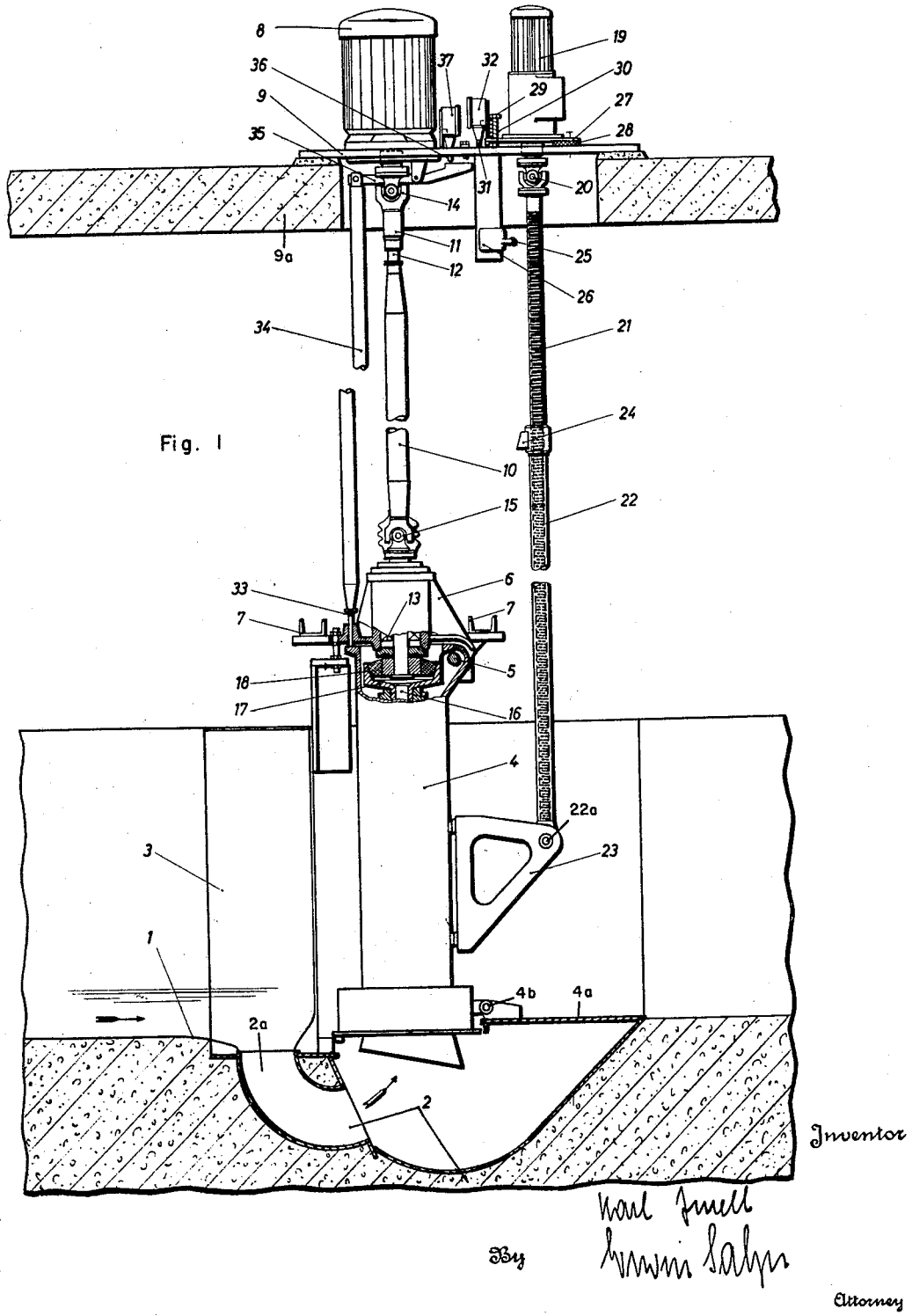

United States Patent Office 3,093,326
Patented June 11, 1963

3,093,326
WATER PURIFICATION AND WASTE
DISPOSAL SYSTEMS
Karl Zurell, Hahnstatten, Germany, assignor to
Passavant Werke, Nassau, Germany
Filed Jan. 27, 1960, Ser. No. 4,990
Claims priority, application Germany Jan. 31, 1959
5 Claims. (Cl. 241—46)

This invention relates generally to machines mounted to operate below a head of water and submersed in a body of water. From a more limited point of view this invention relates to water purification and waste disposal systems.

In a particular successful kind of such systems a stationary rake having horizontal rake-bars is arranged across a body of flowing water to retain solid matter which the water carries with it. Solid matter retained by the rake is removed from the rake by means of a comb engaging the rake and movable relative to the rake. This comb shifts solid matter along the rake to one end thereof where it is released and caused to sink to the bottom of the bed of the body of water to be purified. From there a mixture of solid matter and water is fed into a crushing device, or other comminuting device. Such a device reduces the size of solid matter so drastically that the mixture of solid matter and water can be re-introduced into the body of water, or readily otherwise be disposed of.

This invention, while not limited to water purification and waste disposal systems of the above character, is particularly adapted to be used in combination with such systems.

United States Patent 2,911,099 to Harald Joachim Georg Schade, Crushing Machine, issued November 3, 1959 relates to a rotatable crushing device for comminuting solid matter removed from a flowing body of water. The crushing machine or device disclosed in the above patent comprises a cage formed by a stationary system of spaced vertical bars, a rotatable vertical shaft supporting a horizontal arm, and a crushing tool supported by said arm and rotatable inside said cage to crush foreign matter therein by compressing the same between said rotatable crushing tool and said system of bars. In water purification systems crushing devices of this description are installed below the level of a body of water to be purified by removal of solid matter therefrom and solid matter deposited adjacent the intake of such crushing devices by the action of gravity is sucked into the housing of the crushing device by the action of the rotating crushing tool which operates as an impeller. It is necessary from time to time to raise the crushing device above the level of the body of water in which it is submersed in order to inspect the crushing device and to replace parts thereof which may have been worn by the crushing action.

United States Patent 2,860,835 to Harald Joachim Georg Schade, Tiltable Underwater Machine Structure, issued November 18, 1958 is concerned with an arrangement of parts which permits to readily raise a crushing device of the kind disclosed in, and covered by, the aforementioned U.S. Patent 2,911,099 above the level of the body of water in which it is installed. According to U.S. Patent 2,860,835 a housing is formed by two complementary parts or portions of which one is fixedly mounted on the bottom of the bed for the body of water to be purified and the other has an extension mounted on a horizontal pivot arranged above the surface of the body of water to be purified. The upper pivotally mounted portion of the housing may accommodate all the part of a crushing device constructed according to U.S. Patent 2,911,099 which require periodic inspection, and that portion may be raised above the level of the body of water by a pivotal motion thereof, thus making all the parts housed therein and normally submersed in a body of water readily accessible.

The arrangement of parts shown in U.S. Patent 2,860,-835 cannot readily be applied in cases where the difference between the low water mark and the high water mark is considerable, i.e. where the level of the water undergoes considerable changes. Such changes may be due, for instance, to extensive rain falls, storms, or the like, or may result from the particular operating conditions of a given waste disposal and water purification system.

It is one object of the invention to provide structures making it possible to raise rotatable crushing devices, or comminuting devices, installed under water, above the level of the body of water in which they are installed, which structures are also applicable in instances where the level of the body of water undergoes drastic changes.

It is another object of the invention to provide structures which make it possible to tilt rotatable underwater crushing devices above the surface of a body of water, which structures are adapted to be readily adjusted to compensate for tolerances of the nature encountered in concrete work where such structures must be installed.

It is still another object of the invention to provide structures which make it possible to tilt rotatable underwater crushing devices above the surface of the body of water in which they are submersed, which structures lend themselves to semi-automation or full automation of purification and waste disposal operations.

Other objects and advantages of the invention will, in part, be obvious and in part appear hereinafter.

Figure 2:
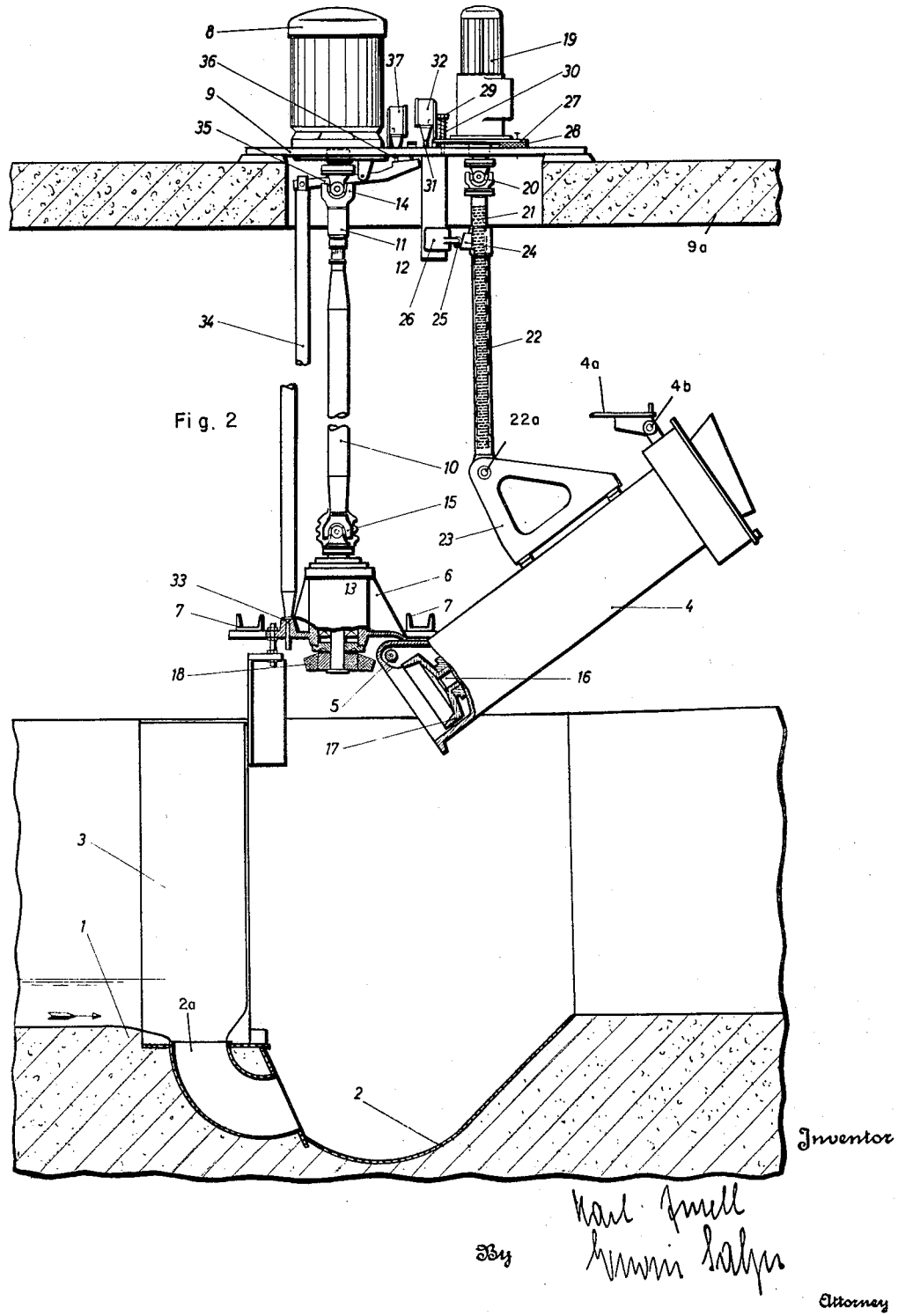

For a more complete understanding of the invention reference may be had to the following detailed description thereof taken in connection with the accompanying drawings wherein FIG. 1 shows a system embodying the invention partly in side elevation and partly in a vertical section, all constituent parts of the system being shown in the normal operating position thereof; and FIG. 2 shows the same structure as FIG. 1 in the same way as FIG. 1, however, the constituent parts of the system being shown in the inspection and repair or replacement position rather than in the normal operating position thereof.

Referring now to the drawings, numeral 1 has been applied to indicate the bottom of a bed for a flowing body of water to be purified, and numeral 2 has been applied to indicate a portion of a composite comminuter housing which portion is fixedly attached to the bottom of the aforementioned bed. Housing structure 2 of the comminuter or crushing device does not accommodate any movable parts. The left side of housing structure 2 forms an intake for the mixture of water and solid matter to be crushed or comminuted. The right side of housing structure 2 forms a trough wherein heavy matter that cannot be lifted upwardly by the vortex-producing suction action of the crushing and impeller means housed in housing structure 4 is deposited. A cover 4a for the right side of housing structure 2 is pivotally suspended at 4b on housing structure 4. Cover 4a may be opened by means of a tool from above of the level of the water to be purified, and solid matter not capable of being crushed or comminuted such as, for instance, large rocks or large chunks of metal, may be lifted from the place where such matter has been deposited by gravity. Reference numeral 3 has been applied to indicate a vertical baffle which guides solid matter to the intake opening 2a of fixed housing structure 2. Housing structure 4 complementing housing structure 2 is substantially in the shape of a vertically arranged cylinder and houses all the parts of the crushing or comminuting device which require periodic inspection or replacement. The crushing device or comminuting device proper has not been shown in the drawings since it has no immediate bearing upon the present invention. Reference may, however, be had to the aforementioned U.S. Patent 2,911,099 for a complete disclosure of a crushing tool which may be used for carrying the present invention into effect. Numeral 6 has been applied to indicate a composite structure fixedly supported by a pair of horizontal U-beams 7. Composite structure 6 combines a vertical shaft bearing 13 and a horizontal fixed pivot 5 into a self-contained structural unit. Pivot 5 supports the upper portion of the composite housing 2, 4. The electric motor 8 is arranged in coaxial relation to housing structure 4 and above housing structure 4 and rests upon a frame or base plate 9 supported by concrete structure 9a. The upper level of the latter is so high as to exclude any danger to electric machinery and apparatus mounted on base plate or frame 9, even if the level of the body of water below rises from normal indicated in FIGS. 1 and 2 to the highest water mark under consideration. Motor 8 is intended to drive the crushing device housed below. To this end vertical shaft means 10 extend downwardly from motor 8 into housing structure 4. Numerals 11 and 12 have been applied to indicate two telescoping portions of shaft means 10, making it possible to adjust the length of shaft means 10 to compensate, when installing the structure, for unavoidable tolerances. Shaft portion 12 is a multispline shaft positively driven by the driving shaft portion 11. The latter is coupled with motor 8 by the intermediary of a universal joint 14. Universal joint 15 interposed into shaft means 10 is arranged immediately above the composite structure 6 of which bearing 13 for shaft means 10 forms an integral part. It will be apparent that universal joints 14 and 15 are provided in shaft means 10 for the purpose of compensating for lateral tolerances. The upper end of housing structure 4 accommodates an automatic clutch 17, 18, preferably a cone clutch. The parts 17, 18 of that clutch are shown in FIG. 1 in the engaged position thereof and in FIG. 2 in the disengaged position thereof. Disengagement of parts 17, 18 is effected automatically when housing structure 4 is pivoted in counterclockwise direction from the normal operating position shown in FIG. 1 to the raised position, or inspection and repair position, shown in FIG. 2. Re-engagement of parts 17, 18 is effected automatically when housing structure 4 is pivoted in clockwise direction from the position shown in FIG. 2, or inspection and repair position, to the normal operating position shown in FIG. 1. Reference numeral 16 has been applied to indicate that portion of shaft means 10 immediately adjacent to the rotatable parts of the crushing device accommodated in housing structure 4 and supporting the cone-shaped portion 17 of clutch 17, 18.

The mechanism for tilting housing structure 4 about horizontal pivot 5 and for coupling and uncoupling clutch 17, 18 comprises a unit 19 which combines an electric motor and a reduction gear. Motor unit 19 operates an externally screw-threaded shaft 21 which engages an internally screw-threaded length of tubing 22. Shaft 21 is driven by motor unit 19 by the intermediary of a universal joint 20. The lower end of tube 22 is hinged at 22a to a cantilever bracket 23 affixed to one side of housing structure 4. The upper end of tube 22 supports an abutment 24 adapted to co-operate with an abutment 25 in the form of a roller controlling the limit switch 26. Abutment 24 engages roller 26 when housing structure 4 reaches the upper limit position thereof shown in FIG. 2. The limit switch 26 causes instant stopping of the motor unit 19 when abutments 25 and 26 engage. Motor unit 19 rests upon a frame structure or base plate 27 mounted on a rubber pad 28, or a pad of a similarly resilient material. Pad 28 is supported by frame or plate 9 which, as mentioned above, is mounted on concrete foundation 9a. Pad 28 forms, in effect, a hinge, allowing motor unit 19 to be slightly rocked. Set screw 29 surrounded by spring 30 projecting through plate 27 and abutting against plate 9 allows to adjust the position of motor unit 19 and plate 27 relative to frame or plate 9. Numeral 32 has been applied to indicate a limit switch mounted on frame structure or base plate 27 adjacent the left edge thereof. Operating plunger 31 of limit switch 32 is secured to plate 9. When housing structure 4 is tilted about pivot 5 to the lower position thereof as shown in FIG. 1, the telescoping parts 21, 22 exert an upward thrust upon plate 27 and motor unit 19. As a result motor unit 19 and plate 27 are slightly tilted in clockwise direction. This causes lifting of limit switch 32 which, in turn, causes motor unit 19 to stop instantly.

Numeral 37 has been applied to indicate a disconnect switch for disconnecting electric motor 8 from its power supply. Disconnect switch 37 is operable by means of operating plunger 36 which is biased to the closed position of switch 37. Plunger 36 may be operated by a linkage 34 comprising the lever 35 adapted to engage plunger 36. The lower end of linkage 36 is in the form of a sensing pin 33 slidably mounted in a direction longitudinally thereof in composite structure 6. The lower end of sensing pin 33 forms an abutment adapted to be engaged by the upper rim of housing structure 4 when the latter reaches its normal operating position shown in FIG. 1. As long as housing structure 4 is not in its normal operating position shown in FIG. 1, pin 36 is maintained by lever 35 in its upper position and this causes disconnect switch 37 to maintain motor 8 disconnectd from its power supply. When sensing pin 33 is raised by the upper rim of housing structure 4 to the position shown in FIG. 1, lever 35 moves out of engagement with pin 36, and this allows plunger 36 to move to the lower position thereof, causing closing of disconnect switch 37 and allowing motor 8 to be energized from its power supply. Thus disconnect switch 37 positively precludes operation of motor 8 at such times when that motor should not be operated for safety reasons.

The lateral displacement of parts 4 and 19, 21 is necessary but should not substantially exceed the proportions shown in FIGS. 1 and 2.

It will be understood that parts 21, 22 form a telescoping tie mechanism which could be substituted by another telescoping tie mechanism, or transmission means other than telescoping tie mechanisms.

While this invention is primarily intended to be applied in combination with water purification and waste disposal systems and rotatable underwater crushing devices, or comminuting devices, the invention is not limited to such systems and devices. The invention is applicable to various kinds of water submersed machines having rotatable wear-subjected parts which must undergo periodic inspection and repair and which, for this reason, must be lifted, or pivoted, about the level of the body of water in which they are normally submersed.

Having disclosed a preferred embodiment of the invention it is desired that the same be not limited to the particular structure disclosed. It will be obvious to any person skilled in the art that many modifications and changes may be made without departing from the broad spirit and scope of the invention. Therefore it is desired that the invention be interpreted as broadly as possible and that it be limited only as required by the prior state of the art.

I claim as my invention:

1. A water purification and waste disposal system comprising a first housing defining an intake and defining an outlet for water and solid matter fixedly secured to the bottom of a bed for a body of water, a second housing substantially in the shape of a cylinder vertically arranged above said first housing, said second housing accommodating therein a rotatable crushing machine in the lower portion thereof and defining an intake juxtaposed to said outlet of said first housing to receive the outflow derived from said first housing, a cantilever bracket projecting laterally from said second housing, a fixed horizontal pivot supporting said second housing adjacent the upper end thereof, a first electric motor arranged at a level above said second housing for operating said crushing machine therein, vertical shaft means arranged in co-axial relation to said second housing and including a pair of universal joints operatively relating said first motor and said crushing machine, a cone clutch arranged adjacent the upper end of said second housing interposed into said shaft means movable between an engaged position and a disengaged position thereof by pivoting said second housing about said pivot relative to said first motor and to said first housing, a second electric motor arranged at a level above said second housing and laterally spaced therefrom for tilting said second housing about said pivot, and a transmission means operatively relating said second motor and said cantilever bracket on said second housing, said transmission means comprising a telescoping tie mechanism operated by said second motor and having one end thereof pivotally secured to said cantilever bracket.

2. A water purification and waste disposal system comprising a bottom housing defining an intake and defining an outlet for water and solid matter adapted to be fixedly secured to the bottom of a bed for a body of water, a substantially cylindrical crushing machine housing accommodating a rotatable crushing machine therein, said cylindrical crushing machine housing being arranged vertically and defining an intake at the lower end thereof juxtaposed to said outlet of said bottom housing, a fixed horizontal pivot supporting said crushing machine housing adjacent the upper end thereof, a first electric motor fixedly arranged above said crushing machine housing for operating the crushing machine therein, vertical shaft means arranged in coaxial relation to said crushing machine housing operatively relating said first motor and said crushing machine, a second electric motor fixedly arranged above said crushing machine housing, tie means operatively connected to said crushing machine housing for tilting said crushing machine housing by said second motor about said pivot, said tie means comprising a universal joint, a rotatable externally screw-threaded tie shaft and a cooperating internally screw-threaded tie tube, and a clutch arranged adjacent the upper end of said crushing machine housing interposed into said shaft means and automatically responsive to the tilting motion of said crushing machine housing about said pivot.

3. A water purification and water disposal system comprising a first housing structure defining an intake and defining an outlet for water and solid matter adapted to be fixedly secured to the bottom of a bed for a body of water, a second housing structure accommodating a rotatable crushing machine therein, said second housing structure having an intake juxtaposed to said outlet of said first housing structure, a fixed horizontal pivot supporting said second housing structure adjacent the upper end thereof, a first fixed electric motor arranged above said second housing structure for operating the crushing machine therein, vertical shaft means extending from said first motor into said second housing structure, a second fixed electric motor arranged above said second housing structure, a resiliently supported frame structure supporting said second motor, a first limit switch adapted to stop said second motor in response to movement of said frame structure, a second limit switch adapted to stop said second motor, tie means operatively connected to said second housing structure for causing said second motor to selectively tilt said second housing about said pivot to an upper position and to a lower position, said tie means including a rotatable externally screw-threaded tie shaft driven by said second motor and a cooperating internally screw-threaded tie-tube having one end thereof hinged to said second housing structure, and abutment means forming an integral part of said tie tube for operating said second limit switch in said upper position of said second housing, and a clutch interposed into said shaft means automatically responsive to the tilting motion of said second housing structure about said pivot.

4. A water purification and waste disposal system comprising a bottom housing structure defining an intake and defining an outlet for water and solid matter fixedly secured to the bottom of a bed for a body of water, a crushing machine housing structure accommodating a rotating crushing machine therein, said crushing machine housing structure being substantially in the shape of a cylinder vertically arranged above said bottom housing structure and having an intake juxtaposed to said outlet of said bottom housing structure, a first electric motor fixedly arranged above said crushing machine housing structure for operating said crushing machine therein, vertical shaft means arranged in co-axial relation to said crushing machine housing structure and including a pair of universal joints extending from said first motor into said crushing machine housing structure, a fixed bearing structure for said vertical shaft means arranged adjacent the upper end of said crushing machine housing structure, horizontal pivot means pivotally supporting said crushing machine housing structure adjacent the upper end thereof and integrated with said bearing structure to jointly form an integral composite structure, a second electric motor fixedly arranged above said crushing machine housing structure and laterally spaced therefrom, a telescoping tie mechanism operated by said second motor and having one end thereof secured to said crushing machine housing structure to tilt said crushing machine housing structure about said pivot means, and a clutch arranged adjacent the upper end of said crushing machine housing structure interposed into said shaft means and adapted to be operated by the tilting motion of said crushing machine housing structure about said pivot means.

5. A system as specified in claim 4 comprising a switch for disconnecting said first motor from the power supply thereof arranged substantially at the level of said first motor, a linkage for controlling the operation of said switch having one end arranged adjacent said switch and one end arranged adjacent said integral bearing structure and pivot means, a vertical pin for operating said linkage slidably supported by said integral bearing structure and pivot means, and said pin having a lower tip adapted to be engaged by said crushing machine housing structure and to be lifted by engagement with said crushing machine housing structure.

References Cited in the file of this patent

UNITED STATES PATENTS

| | | |
|---|---|---|
| 2,475,573 | Smith et al. | July 5, 1949 |
| 2,807,174 | Helzel | Sept. 24, 1957 |
| 2,860,835 | Schade | Nov. 18, 1958 |
| 2,910,181 | Schade | Oct. 27, 1959 |

FOREIGN PATENTS

| | | |
|---|---|---|
| 666,444 | Great Britain | Feb. 13, 1952 |
| 1,124,146 | France | June 25, 1956 |